UNITED STATES PATENT OFFICE.

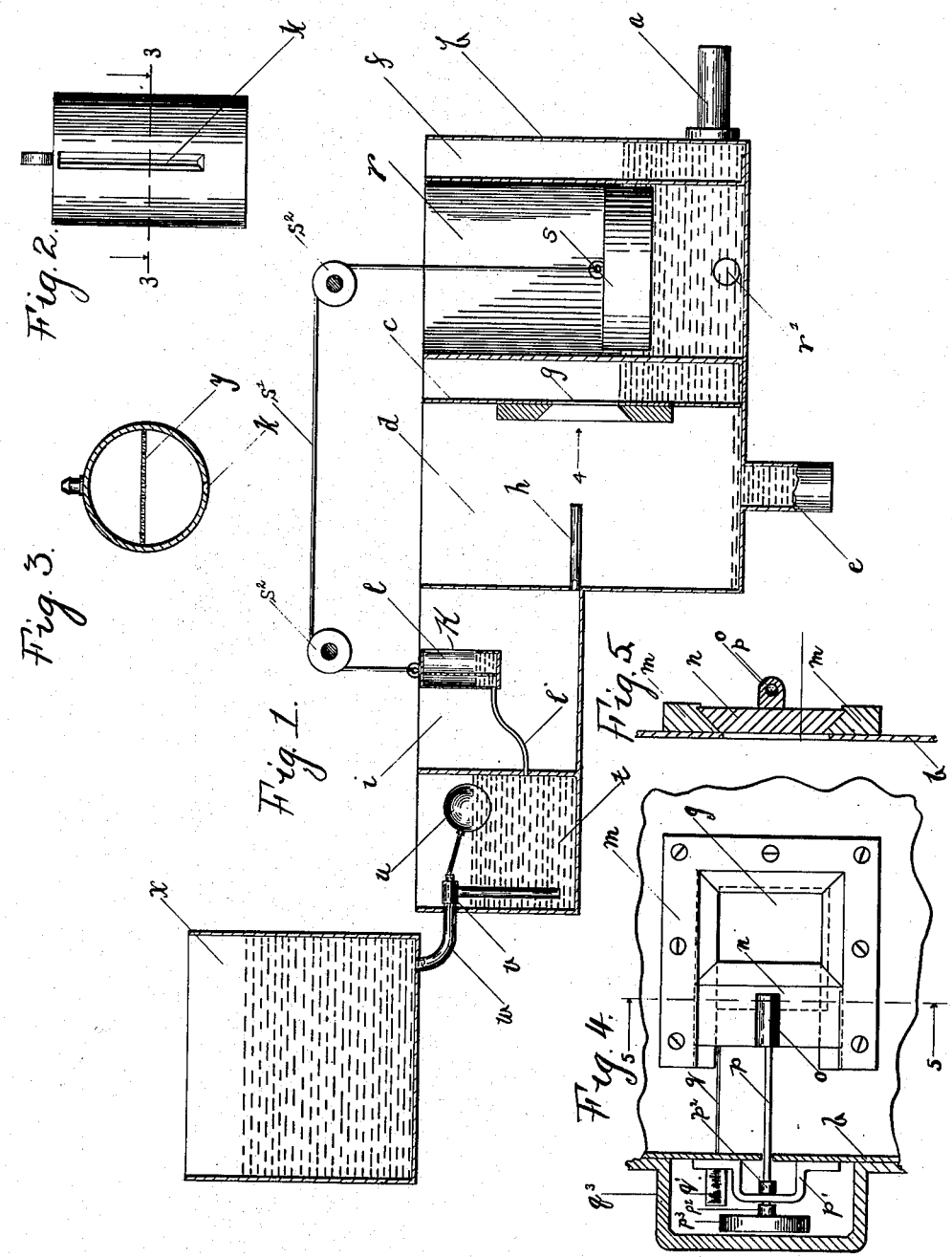

KENT W. BARTLETT, OF CHICAGO, ILLINOIS.

WATER-SOFTENING APPARATUS.

No. 885,828.  Specification of Letters Patent.  Patented April 28, 1908.

Application filed September 21, 1906. Serial No. 335,640.

*To all whom it may concern:*

Be it known that I, KENT W. BARTLETT, citizen of the United States, residing at Chicago, in the county of Cook and State of Illinois, have invented a certain new and useful Improvement in Water-Softening Apparatus, of which the following is a full, clear, concise, and exact description, reference being had to the accompanying drawings, forming a part of this specification.

My invention relates to water softening or purifying apparatus.

It is one of the objects of my invention to provide improved means for automatically regulating the discharge of chemical by the water to be softened or purified. This feature of my invention is practiced by effecting an adjustment of the level of the chemical with respect to the discharge opening for the chemical, whereby the quantity of chemical that flows through said opening is determined and made proportional to the quantity of water that happens to be flowing, the position of the chemical level with respect to the discharge opening being governed by the water. I broadly claim this feature.

Another feature of my invention resides in providing an adjustment for determining the relative sizes of the discharge openings for the water and the chemical that is to be mixed with the water.

Another feature of my invention resides in the provision of a metal through which the opening affording passage for the chemical may be formed, which metal is free from the corrosive action to which metals have hitherto been subject. By means of this feature of the invention, the discharge opening will never vary in size, owing to the action of the chemical, whereby the rate of flow through the chemical discharge opening will never be improperly varied as it would be if the metals hitherto employed were used. I have selected lead as the metal for withstanding chemical attack, and I preferably, though not necessarily, combine another metal with the lead in a quantity insufficient to be subject to chemical attack and yet sufficient to impart a desired rigidity to the lead, it being particularly desirable to add this other metal when the entire chamber or container for the chemical having the opening through which the chemical is to be discharged into the water. is made of lead. I have employed an alloy of lead and antimony, using eighty-five parts of lead by weight and fifteen parts of antimony.

I will explain my invention more fully by reference to the accompanying drawing, showing the preferred embodiment of the invention, in which:—

Figure 1 is a diagrammatic view showing elements of my apparatus in elevation as these elements may be assembled to constitute a complete working apparatus. Fig. 2 is an elevation of that chemical containing chamber provided with the discharge opening which permits the flow of the chemical into the water, this view showing more clearly the shape of said discharge opening. Fig. 3 is a sectional plan view on line 3 3 of Fig. 2. Fig. 4 is a view taken in the direction of arrow 4 of Fig. 1, showing so much of the water containing tank as is necessary to understand how the discharge opening may be adjusted in order to regulate the relative sizes of the water and chemical discharge openings. Fig. 5 is a sectional view on line 5 5 of Fig. 4.

Like parts are indicated by similar characters of reference throughout the different figures.

The water that is to be softened or purified may be received through a pipe $a$ leading from a suitable source of supply, said pipe discharging into a tank $b$, which tank is preferably a double tank, being so constituted by a partition wall $c$. The mixture of chemical and water occurs in the tank portion $d$, this tank portion having a discharge pipe $e$ that conveys the intermixed water and chemical to its destination, as, for example, a precipitating tank. The water is discharged into the tank portion $d$ from the tank portion $f$ through the opening $g$ in the wall $c$, while the chemical is discharged into the tank portion $d$ through a pipe $h$, this pipe $h$ affording communication between the chamber $d$ and a chamber $i$, into which the chemical is discharged, this chemical being discharged into the chamber $i$ through an opening $k$ in the vertical wall of a vessel $l$ to which the chemical is supplied in a manner more fully to be hereinafter set forth.

In order that the quantity of water flowing may be made to bear a proper proportion to a given quantity of chemical that is being discharged from the chamber $l$, or, in other words, in order that the chemical that is flowing may be properly proportioned in quantity to a given flow of water, I provide some adjusting means whereby this proportion may be adjustably determined and fixed, to which end I adjust the size of the opening $g$. This adjustment I preferably secure by the construction shown particularly in Figs. 4 and 5, wherein a guiding frame $m$ is disposed upon three sides of the opening $g$. A slide $n$ works in this guiding frame, by adjustment of which the size of the opening $g$ is regulated. For the purpose of this adjustment, I desirably form an enlargement $o$ upon the slide $n$ and engage the threads of a shaft $p$ with the threads provided within a bore formed in said enlargement. This shaft engages a stirrup $p^1$, which stirrup engages collars $p^2$ $p^2$ fixed upon the shaft, so that said shaft, while capable of rotation, is not capable of longitudinal movement. A hand wheel $p^3$ mounted upon the shaft, enables the rotation of the shaft, whereby the slide $n$ may be moved backward and forward to regulate the size of the opening $g$. An index rod $q$ is actuated by the slide $n$, said index rod being desirably mounted directly upon said slide and projecting through a wall of the chamber $b$, so that the free end of the rod $q$ may act as an index to ride over a scale $q^1$ that will indicate to the operator the size of the opening $g$. This is the preferred mechanism for adjusting the relative sizes of the openings $g$ and $k$, but I do not wish to be limited to the precise mechanism that I have illustrated for effecting this adjustment.

It will be seen that the size of the opening $g$ may be regulated upon the exterior of the chamber $b$ and that the extent of such regulation is shown by the indicating mechanism $q$ $q^1$, visible upon the exterior of said chamber. I desirably guard the index mechanism and the regulating mechanism $p$ $p^3$ by means of a shield $q^2$, which may be locked in place to cover these parts, it being intended that only those that are authorized shall have access to the regulator.

Assuming given sizes for the openings $g$ and $k$, I provide means whereby as the quantity of water flowing through the opening $g$ varies, the quantity of chemical discharged into the water also varies in proportion. I will describe the apparatus in which this is accomplished in accordance with the preferred embodiment of my invention. In this apparatus there is included a guide $r$, which may be in the form of a cylinder perforated at $r^1$ sufficiently near the bottom to insure the continual presence of moving water in the cylinder, the guide $r$ directing the float $s$ in vertical travel, the float being carried by the water and rising and falling as the level of the water rises and falls, or, in other words, as the quantity of water flowing through the opening $g$ varies. A flexible belt $s^1$ is attached to this float $s$, and desirably passes over pulleys $s^2$ $s^2$, the other end of this belt carrying the chamber or container $l$ into which the chemical that is to be supplied to the water is discharged by any suitable means. In the embodiment of the invention shown, I have employed for the purpose of supplying this container $l$ with chemical, a flexible pipe or movable piping $l^1$ that affords connection between the bottom portions of the chamber $l$ and a chamber $t$.

The chamber $t$ constitutes what may be termed a constant level chamber, as the chemical is maintained therein at a constant level with the aid of a float $u$ supported by the chemical in the chamber $t$, and which regulates the valve $v$ included in a duct $w$, that may, when the valve $v$ is open, establish communication between the constant level chamber $t$ and a main reservoir $x$. The opening $k$ in the chamber or container $l$ desirably extends to the top of the container but does not extend quite to the bottom, so that a quantity of chemical is always assured in said container. It will be seen that by means of the pipe $l^1$ (which is the agency I prefer for the purpose to be stated) the level of the liquid in the chamber $t$ is coincident with the level of the liquid in the container $l$, which is the case no matter what may be the vertical position of the container $l$. In the preferred embodiment of the invention, the vertical position of the container $l$ is changed and determined by the water in the chamber $f$ through the agency of the float $s$ and the belt $s^1$ connecting said float with the container $l$. When the float $s$ rises, which it does upon an increase of the discharge of the water from the chamber $f$, the container $l$ is lowered, obviously, whereby the level of the chemical in said latter container is raised with respect to the opening $k$, so that more chemical flows through the opening $k$, whereby the ratio between the chemical and water is maintained. If the volume of water being discharged from the chamber $f$ decreases, the float $s$, obviously, descends, whereby the container $l$ is elevated, as a consequence of which the level of the chemical in said chamber is lowered with respect to the opening $k$, thereby properly reducing the amount of chemical that is discharged into the water. While I prefer to move the container $l$, I do not wish to be limited to this method of regulating the level of the chemical with respect to the discharge opening $k$.

I desirably interpose a perforated baffle-plate $y$ between the pipe $l^1$ and the opening $k$, so that the chemical will not surge through the said opening. The opening $k$ is desirably formed in a metal that will not be subject to the corrosive action of the chemical, which metal is desirably lead having antimony intermixed therewith to impart rigidity to the lead, if the entire container $l$ is to be made of the same material, as hitherto stated. Metal has hitherto been found objectionable, because it would not withstand chemical attack, but metal is desirable because it enables the formation of sharp edges that margin the opening k, and I believe that I am the first to use a metal in which a slot may be properly formed, which slot would retain its original size, because I make use of a metal that will withstand attack of the chemical.
I have not deemed it necessary to mention the various chemicals that may be used in my apparatus, as any suitable chemical may be employed, as is well known by those skilled in the art.
While I have herein shown and particularly described the preferred embodiment of my invention, I do not wish to be limited to the precise apparatus illustrated, but,

Having thus described my invention, I claim as new and desire to secure by Letters Patent:

1. A water softening apparatus including a container for chemical having a discharge opening for permitting the passage of the chemical into the water, and mechanism automatically operated by the water for causing the level of the chemical to occupy varying positions relatively with respect to the discharge opening to alter the quantity of chemical supplied to the water as the quantity of water supplied for treatment varies.

2. A water softening apparatus including a container for chemical having a discharge opening for permitting the passage of chemical into the water, and mechanism automatically operated by the water for regulating the position of the container to thereby adjust the level of the chemical with respect to the discharge opening to vary the quantity of chemical supplied to the water as the quantity of water supplied for treatment varies.

3. A water softening apparatus including a container for chemical having a discharge opening for permitting the passage of chemical into the water, and mechanism automatically operated by the water serving to vary the vertical position of the container to thereby adjust the level of the chemical with respect to the discharge opening to vary the quantity of chemical supplied to the water as the quantity of water supplied for treatment varies.

4. A water softening apparatus including a container for chemical having a discharge opening for permitting the passage of chemical into the water, mechanism automatically operated by the water for regulating the level of the chemical with respect to the discharge opening to vary the quantity of chemical supplied to the water as the quantity of water supplied for treatment varies, and a constant level chamber in communication with said container serving to maintain the same supplied with chemical.

5. A water softening apparatus including a container for chemical having a discharge opening for permitting the passage of chemical into the water, mechanism automatically operated by the water for regulating the position of the container to thereby adjust the level of the chemical with respect to the discharge opening to vary the quantity of chemical supplied to the water as the quantity of water supplied for treatment varies, and a constant level chamber in communication with said container serving to maintain the same supplied with chemical.

6. A water softening apparatus including a container for chemical having a discharge opening for permitting the passage of chemical into the water, mechanism automatically operated by the water serving to vary the vertical position of the container to thereby adjust the level of the chemical with respect to the discharge opening to vary the quantity of chemical supplied to the water as the quantity of water supplied for treatment varies, and a constant level chamber in communication with said container serving to maintain the same supplied with chemical.

7. A water softening apparatus including a container for chemical having a discharge opening for permitting the passage of chemical into the water, mechanism automatically operated by the water for regulating the level of the chemical with respect to the discharge opening to vary the quantity of chemical supplied to the water as the quantity of water supplied for treatment varies, a constant level chamber in communication with said container serving to maintain the same supplied with chemical, and movable piping affording means for effecting the communication between said constant level chamber and container.

8. A water softening apparatus including a container for chemical having a discharge opening for permitting the passage of chemical into the water, mechanism automatically operated by the water for regulating the position of the container to thereby adjust the level of the chemical with respect to the discharge opening to vary the quantity of chemical supplied to the water as the quantity of water supplied for treatment varies, a constant level chamber in communication with said container serving to maintain the same supplied with chemical, and movable piping affording means for effecting the communication between said constant level chamber and container.

9. A water softening apparatus including a container for chemical having a discharge opening for permitting the passage of chemical into the water, mechanism automatically operated by the water serving to vary the vertical position of the container to thereby adjust the level of the chemical with respect to the discharge opening to vary the quantity of chemical supplied to the water as the quantity of water supplied for treatment varies, a constant level chamber in communication with said container serving to maintain the same supplied with chemical, and movable piping affording means for effecting the communication between said constant level chamber and container.

10. A water softening apparatus including a container for chemical having a discharge opening for permitting the passage of chemical into water, and mechanism automatically operated by the water for regulating the level of the chemical with respect to the discharge opening to vary the quantity of chemical supplied to the water as the quantity of water supplied for treatment varies, said mechanism including a float supported by the water and having operative connection with said container.

11. A water softening apparatus including a container for chemical having a discharge opening for permitting the passage of chemical into the water, and mechanism automatically operated by the water for regulating the position of the container to thereby adjust the level of the chemical with respect to the discharge opening to vary the quantity of chemical supplied to the water as the quantity of water supplied for treatment varies, said mechanism including a float supported by the water and having operative connection with said container.

12. A water softening apparatus including a container for chemical having a discharge opening for permitting the passage of chemical into the water, and mechanism automatically operated by the water serving to vary the vertical position of the container to thereby adjust the level of the chemical with respect to the discharge opening to vary the quantity of chemical supplied to the water as the quantity of water supplied for treatment varies, said mechanism including a float supported by the water and having operative connection with said container.

13. A water softening apparatus including a container for chemical having a discharge opening for permitting the passage of chemical into the water, mechanism automatically operated by the water for regulating the level of the chemical with respect to the discharge opening to vary the quantity of chemical supplied to the water as the quantity of water supplied for treatment varies, said mechanism including a float supported by the water and having operative connection with said container, and a constant level chamber in communication with said container serving to maintain the same supplied with chemical.

14. A water softening apparatus including a container for chemical having a discharge opening for permitting the passage of chemical into the water, mechanism automatically operated by the water for regulating the position of the container to thereby adjust the level of the chemical with respect to the discharge opening to vary the quantity of chemical supplied to the water as the quantity of water supplied for treatment varies, said mechanism including a float supported by the water and having operative connection with said container, and a constant level chamber in communication with said container serving to maintain the same supplied with chemical.

15. A water softening apparatus including a container for chemical having a discharge opening for permitting the passage of chemical into the water, mechanism automatically operated by the water serving to vary the vertical position of the container to thereby adjust the level of the chemical with respect to the discharge opening to vary the quantity of chemical supplied to the water as the quantity of water supplied for treatment varies, said mechanism including a float supported by the water and having operative connection with said container, and a constant level chamber in communication with said container serving to maintain the same supplied with chemical.

16. A water softening apparatus including a container for chemical having a discharge opening for permitting the passage of chemical into the water, mechanism automatically operated by the water for regulating the level of the chemical with respect to the discharge opening to vary the quantity of chemical supplied to the water as the quantity of water supplied for treatment varies, said mechanism including a float supported by the water and having operative connection with said container, a constant level chamber in communication with said container serving to maintain the same supplied with chemical, and movable piping affording means for effecting the communication between said constant level chamber and container.

17. A water softening apparatus including a container for chemical having a discharge opening for permitting the passage of chemical into the water, mechanism automatically operated by the water for regulating the position of the container to thereby adjust the level of the chemical with respect to the discharge opening to vary the quantity of chemical supplied to the water as the quantity of water supplied for treatment varies, said mechanism including a float supported by the water and having operative connection with said container, a constant level chamber in communication with said container serving to maintain the same supplied with chemical, and movable piping affording means for effecting the communication between said constant level chamber and container.

18. A water softening apparatus including a container for chemical having a discharge opening for permitting the passage of chemical into the water, mechanism automatically operated by the water serving to vary the vertical position of the container to thereby adjust the level of the chemical with respect to the discharge opening to vary the quantity of chemical supplied to the water as the quantity of water supplied for treatment varies, said mechanism including a float supported by the water and having operative connection with said container, a constant level chamber in communication with said container serving to maintain the same supplied with chemical, and movable piping affording means for effecting the communication between said constant level chamber and container.

19. A water softening apparatus including a liquid container having a discharge opening for permitting the passage of liquid from the container, and mechanism automatically operated by the water provided for treatment for causing the level of the liquid to occupy varying positions relatively with respect to the discharge opening to alter the quantity of liquid discharged from the container as the quantity of water supplied for treatment varies.

20. A water softening apparatus including a liquid container having a discharge opening for permitting the passage of liquid from the container, and mechanism automatically operated by the water provided for treatment for regulating the position of the container to thereby adjust the level of the liquid within the container relatively with respect to the discharge opening to alter the quantity of liquid discharged from the container as the quantity of water supplied for treatment varies.

21. A water softening apparatus including a liquid container having a discharge opening for permitting the passage of liquid from the container, and mechanism automatically operated by the water provided for treatment for regulating the position of the discharge opening to thereby adjust the level of the liquid within the container relatively with respect to the discharge opening to alter the quantity of liquid discharged from the container as the quantity of water supplied for treatment varies.

22. A water purifying apparatus comprising a reservoir, a discharge therefrom, variable according to the volume of water therein, a water supply thereto, a chemical supply, a movable chemical box having a vertical slot therein, and connections to move said box to vary automatically the outflow of chemical from said box according to the supply of water in said reservoir.

23. A water purifying apparatus comprising a reservoir, a variable discharge therefrom, a water supply thereto, a chemical supply, a movable chemical box, having a variable discharge, a float in said reservoir and connections between said float and said chemical box to automatically move the latter so as to discharge variable quantities of chemical according to the position of said float.

24. A water purifying apparatus comprising a reservoir, a discharge therefrom, a movable box having a slot therein extending up and down, and connections to move said box to vary automatically the outflow of material from said box according to the supply in said reservoir.

25. A water purifying apparatus comprising a reservoir, a movable box, having a variable discharge, a float in said reservoir and connections between said float and said box to automatically move the latter so as to discharge variable quantities of material according to the position of said float.

In witness whereof, I hereunto subscribe my name this 17th day of September A. D., 1906.

KENT W. BARTLETT.

Witnesses:
G. L. CRAGG,
LEON G. STROH.